United States Patent
Siddiqui et al.

(10) Patent No.: US 9,560,866 B1
(45) Date of Patent: Feb. 7, 2017

(54) FISH FOOD COMPOSITION

(71) Applicant: KING SAUD UNIVERSITY, Riyadh (SA)

(72) Inventors: Muzzammil Iqbal Siddiqui, Riyadh (SA); Promy Virk, Riyadh (SA); Mohammad Iqbal Siddiqui, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/096,211

(22) Filed: Apr. 11, 2016

(51) Int. Cl.
*A23L 1/302* (2006.01)

(52) U.S. Cl.
CPC .............. *A23K 50/80* (2016.05); *A23K 10/22* (2016.05); *A23K 10/30* (2016.05); *A23K 20/174* (2016.05); *A23K 20/20* (2016.05)

(58) Field of Classification Search
CPC .... A23K 10/22; A23K 20/158; A23K 20/174; A23K 20/20; A23K 50/80; A23K 10/30
See application file for complete search history.

(56) References Cited

U.S. PATENT DOCUMENTS

| 3,903,260 | A | * | 9/1975 | Beigler | A23K 50/80 424/84 |
| 6,849,288 | B2 | | 2/2005 | Oliveira et al. | |
| 8,728,542 | B2 | | 5/2014 | Pickardt et al. | |
| 8,795,744 | B2 | | 8/2014 | Miller et al. | |
| 2009/0162455 | A1 | * | 6/2009 | Koppe | A23K 1/188 424/747 |

FOREIGN PATENT DOCUMENTS

| AU | 2013202195 A1 | 7/2013 |
| CN | 101675760 A * | 3/2010 |

OTHER PUBLICATIONS

Sandra Avant Biology/Ecology, downloaded from https://phys.org, 3 pages, dated Jul. 15, 2014.*
Ganzon-Naret, Erlinda S., "The Use of Green Pea (*Pisum sativum*) as alternative protein source for fish meal in diets for Asian sea bass, *Lates calcarifer*," AACL Bioflux, vol. 6, Issue 4, pp. 399-406, 2013.

* cited by examiner

*Primary Examiner* — Chhaya Sayala
(74) *Attorney, Agent, or Firm* — Richard C. Litman

(57) ABSTRACT

The fish food composition includes pea meal, corn meal, soy bean meal, corn oil, and fish meal. The fish food composition can include less than 17% by weight fish meal and between about 2.0% and 4.0% by weight pea meal. The fish food composition can also include carboxymethyl cellulose and a vitamin and mineral mix.

2 Claims, 2 Drawing Sheets

FISH FOOD COMPOSITION

BACKGROUND OF THE INVENTION

1. Field of the Invention

The present invention generally relates to aquaculture, and particularly to a fish food composition.

2. Description of the Related Art

While food fed to fish typically include synthetic ingredients, pure protein extracts, and/or artificial hormones, natural ingredients in a fish diet are preferred because they are ecofriendly, cost-effective, and are not associated with side effects. One component of many fish food compositions has been fish meal. Fish meal has been a very important ingredient in fish food because of its nutrient profile. Fish meal includes a complete essential amino acid profile, vitamins, minerals, trace elements, and omega 3 fatty acids. As fish meal is primarily made from fish or fish parts, however, preparing fish meal is costly.

Thus, a fish food composition solving the aforementioned problems is desired.

SUMMARY OF THE INVENTION

A fish food composition can include pea meal, corn meal, soy bean meal, corn oil, and fish meal. The fish food composition can include less than 17% by weight fish meal and between about 2.0% and 4.0% by weight pea meal. The fish food composition can also include carboxymethyl cellulose and a vitamin and mineral mix.

These and other features of the present invention will become readily apparent upon further review of the following specification and drawings.

DETAILED DESCRIPTION OF THE PREFERRED EMBODIMENTS

A fish food composition can include pea meal, corn meal, soy bean meal, corn oil, and fish meal. The fish food composition can include a reduced amount of fish meal relative to commercially available fish food. For example, the fish food composition can include less than 17% by weight fish meal. The fish food composition can include from about 2.0% by weight to about 4.0% by weight pea meal. The fish food composition can also include carboxymethyl cellulose and a vitamin and mineral mix. When compared to commercially available fish food, the fish food composition can achieve superior results in fish growth and nutrient profile. The fish food composition can be consumed by Tilapia and other fish.

The seeds of *Pisum sativum* (e.g. pea seeds) are used to make the pea meal of the fish food composition. Use of pea meal in the fish food composition obviates the need for high amounts of fish meal in the fish food composition. The fish food composition is ecofriendly and more cost effective than commercially available fish food. There are also no side effects associated with the fish food composition.

Table 1 provides the ingredients of a first fish food composition (D1) that does not include pea meal, and second (D2) and third (D3) fish food compositions with pea meal according to the present teachings. The second composition (D2) includes about 10% less fish meal than the first composition (D1). The third composition (D3) includes about 20% less fish meal than the first composition (D1). When the compositions (D1)-(D3) were fed to Tilapia, it was found that compositions (D2) and (D3) resulted in improved fish growth and nutrient profile compared to the first composition (D1). As such, pea meal can at least partially replace fish meal in fish food compositions.

TABLE 1

| Ingredients | Diet (D1) | Diet (D2) | Diet (D3) |
| --- | --- | --- | --- |
| Fish Meal | 17 grams | 15.3 grams | 13.6 grams |
| Soybean Meal | 40 grams | 40 grams | 40 grams |
| Pea Meal | 0 grams | 2.2 grams | 4.4 grams |
| Corn Meal | 39 grams | 38.5 grams | 38 grams |
| Carboxymethyl Cellulose | 1 gram | 1 grams | 1 gram |
| Corn Oil | 2 grams | 2 grams | 2 grams |
| Vitamin & Mineral Mix | 1 gram | 1 gram | 1 gram |

Figure 1:
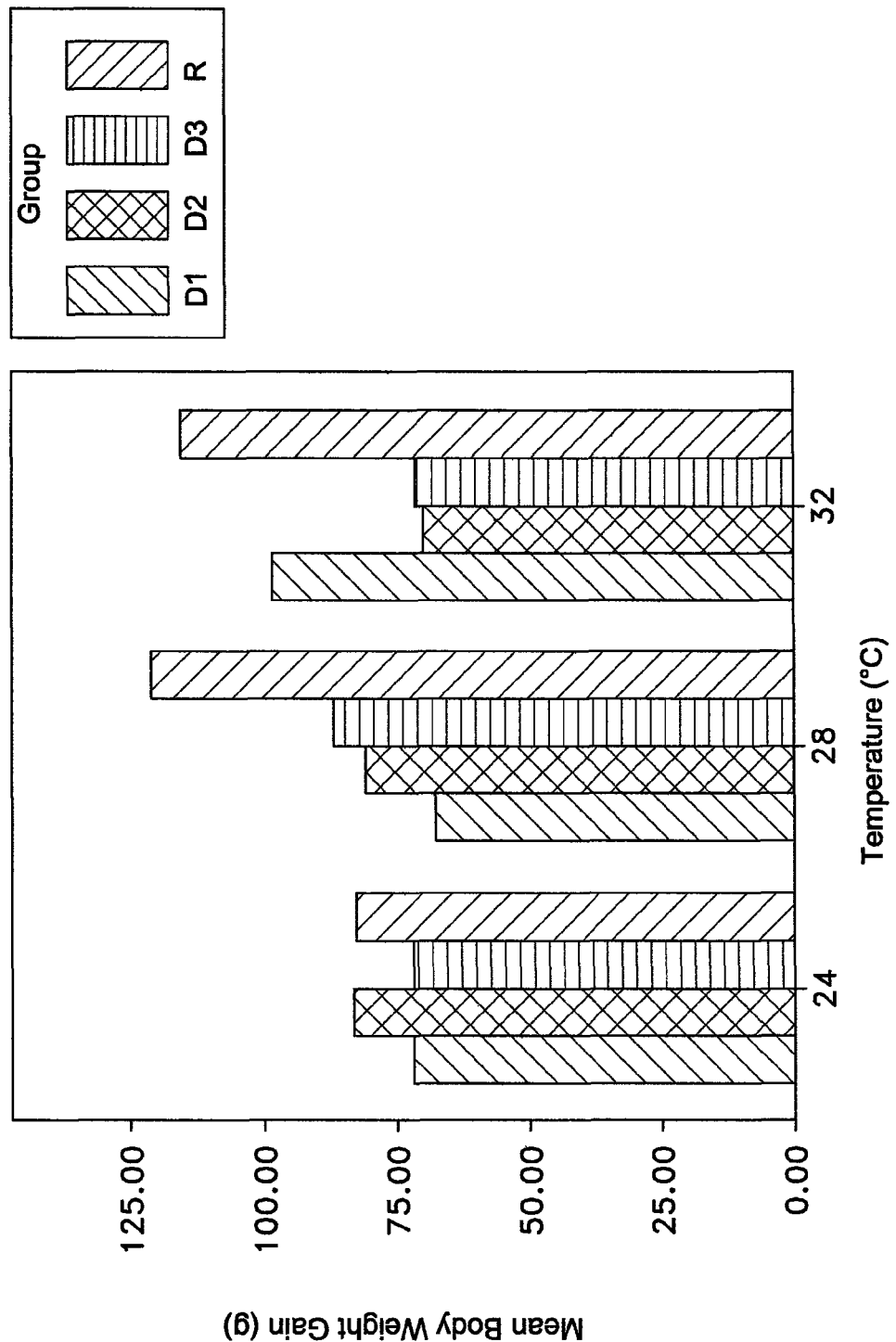
FIG. 1 is a graph illustrating the differences in mean body weight gain (grams) of fish that were fed food composition D1, fish that were fed food composition D2, fish that were fed food composition D3, and fish that were fed food composition R.
Figure 2:
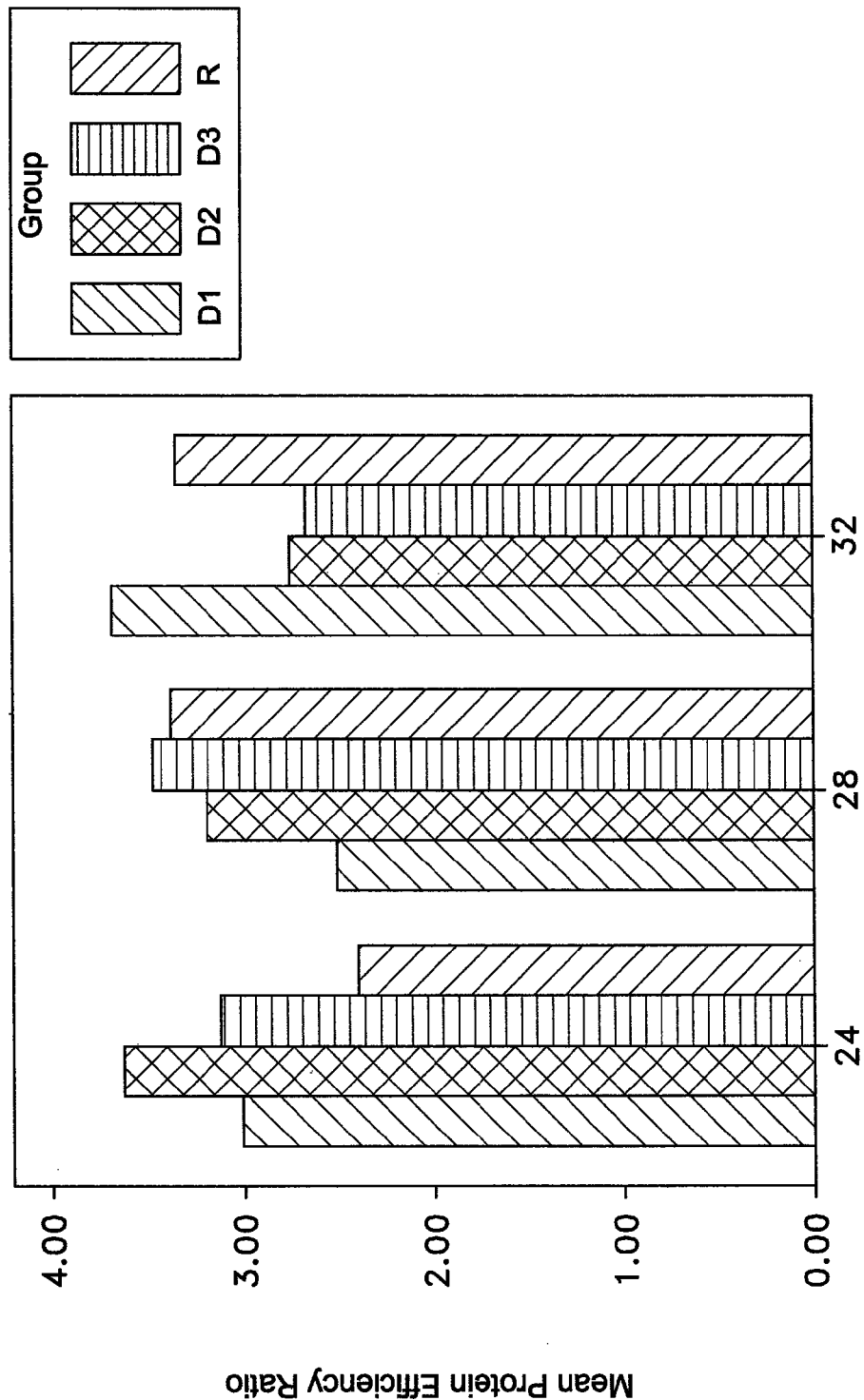
FIG. 2 is a graph illustrating the differences in mean protein efficiency ratio of fish that were fed food composition D1, fish that were fed food composition D2, fish that were fed food composition D3, and fish that were fed food composition R.

As noted above, the present fish food composition including pea meal can achieve improved fish growth and nutrient profile when compared with conventional fish food compositions. FIGS. 1 and 2 illustrate results achieved by testing four distinct fish food compositions, D1, D2, D3, and R, on fish at three different temperatures (24° C., 28° C., and 32° C.). D1 represents a fish food composition known in the art. D2 represents a fish food composition in which about 10% of the amount of fish meal of the first composition (D1) is replaced with pea meal. D3 represents a fish food composition in which about 20% of the amount of fish meal of the first composition D1 is replaced with pea meal. R represents the reference, i.e. commercial diet. FIG. 1 illustrates that there was a greater amount of weight gain (grams) for fish that were fed the D2 and D3 diets as compared with the fish that were fed the D1 diet at lower temperatures, i.e. 24° C. and 28° C. In FIG. 1, same letters indicate significant differences between groups. Groups labeled with the letters a, b, c, e, and h indicate a significant difference of $p \leq 0.05$. Groups labeled with the letters d, f, g, and i indicate a significant difference of $p \leq 0.01$. Groups not labeled or not labeled with letters indicate no significant difference ($p > 0.05$).

FIG. 2 shows the protein efficiency ratio of the fish that were fed the four diets discussed above. As shown in FIG. 2, growth, in terms of protein profile, was greater in fish on the D2 and D3 diets than in fish on the D1 and R diets at lower temperatures, i.e. 24° C. and 28° C. In FIG. 2, same letters indicate significant differences between groups. Groups labeled with the letters a, b, d, e, f, and g indicate a significant difference of $p \leq 0.05$. Groups labeled with the letters h and i indicate a significant difference of $p \leq 0.01$. Groups labeled with the letter c indicate a significant difference of $p \leq 0.001$. Groups not labeled or not labeled with letters indicate no significant difference ($p > 0.05$). It should be understood that a greater percentage of fish meal can be replaced with pea meal in fish food compositions, i.e., greater than 20%. It is preferable, however, that the fish food composition includes some amount of fish meal due to the unique protein profile of fish meal.

The fish food composition can include about 2.0% by weight to about 4.0% by weight pea meal. The fish food composition can include pea meal in an amount exceeding 4.0% by weight. According to one embodiment, the fish food composition can include about 15.3% by weight fish meal; about 40% by weight soybean meal; about 2.2% by weight pea meal; about 38.5% by weight corn meal; about 1% by weight carboxymethyl cellulose; about 2% by weight corn oil; and about 1% by weight vitamin and mineral mix. According to another embodiment, the fish food composition can include about 13.6% by weight fish meal; about 40% by weight soybean meal; about 4.4% by weight pea meal; about 38% by weight corn meal; about 1% by weight carboxymethyl cellulose; about 2% by weight corn oil; and about 1% by weight vitamin and mineral mix.

The fish food composition can be prepared by mixing fish meal, pea meal, corn meal, soy bean meal, and corn oil to form a dough. The dough can then be stored in sealed containers, e.g., plastic boxes, at a temperature of about 4° C., until the dough is ready for use.

It is to be understood that the present invention is not limited to the embodiments described above, but encompasses any and all embodiments within the scope of the following claims.

We claim:

1. A fish food composition, wherein the composition consists of:
   about 15.3% by weight fish meal;
   about 40% by weight soybean meal;
   about 2.2% by weight pea meal;
   about 38.5% by weight corn meal;
   about 1% by weight carboxymethyl cellulose;
   about 2% by weight corn oil; and
   about 1% by weight vitamin and mineral mix.

2. A fish food composition, wherein the composition consists of:
   about 13.6% by weight fish meal;
   about 40% by weight soybean meal;
   about 4.4% by weight pea meal;
   about 38% by weight corn meal;
   about 1% by weight carboxymethyl cellulose;
   about 2% by weight corn oil; and
   about 1% by weight vitamin and mineral mix.

* * * * *